US008675557B2

United States Patent
Le

(10) Patent No.: US 8,675,557 B2
(45) Date of Patent: Mar. 18, 2014

(54) METHOD FOR COMMUNICATION BETWEEN NODES IN A WIRELESS NETWORK

(75) Inventor: Long Le, Dossenheim (DE)

(73) Assignee: NEC Europe Ltd., Heidelberg (DE)

( * ) Notice: Subject to any disclaimer, the term of this patent is extended or adjusted under 35 U.S.C. 154(b) by 268 days.

(21) Appl. No.: 13/060,475

(22) PCT Filed: Aug. 21, 2009

(86) PCT No.: PCT/EP2009/006089
§ 371 (c)(1),
(2), (4) Date: Feb. 24, 2011

(87) PCT Pub. No.: WO2010/022901
PCT Pub. Date: Mar. 4, 2010

(65) Prior Publication Data
US 2011/0149899 A1    Jun. 23, 2011

(30) Foreign Application Priority Data
Aug. 28, 2008    (EP) ..................... 08015164

(51) Int. Cl.
*H04W 4/00*    (2009.01)
(52) U.S. Cl.
USPC ............................ 370/328; 370/449; 455/454
(58) Field of Classification Search
USPC ................. 370/328–339, 449–457, 486–497; 455/454, 450
See application file for complete search history.

(56) References Cited

U.S. PATENT DOCUMENTS

2008/0144524 A1* 6/2008 Hershey et al. ............... 370/254
2011/0032912 A1* 2/2011 Cordeiro et al. .............. 370/336

FOREIGN PATENT DOCUMENTS

JP    2004343509 A    12/2004
JP    2005277599 A    10/2005

OTHER PUBLICATIONS

C-MAC A Cognative MAC Protocol for Multi-Channel Wireless Networks, Apr. 1, 2007, Carlos Cordeiro.*
International Search Report, dated Jan. 26, 2010, from corresponding PCT application.
S. Chaudhuri et al., "A MAC protocol for Multi frequency Physical Layer", Technical Report, Jan. 23, 2003, pp. 1-7, XP-002563400.
Carlos Cordeiro et al., "C-MAC: A Cognitive MAC Protocol for Multi-Channel Wireless Networks", New Frontiers in Dynamic Spectrum Access Networks, Apr. 1, 2007, pp. 147-157.
Priyank Porwal et al., "On-demand channel switching for multi-channel wireless MAC protocols", Proceedings of the 12th European Wireless Conference, Apr. 2-5, 2006, pp. 1-12, XP-007905659.
Translation of Japanese Office Action, dated Oct. 17, 2012, from corresponding JP application.

* cited by examiner

*Primary Examiner* — Ricky Ngo
*Assistant Examiner* — Iqbal Zaidi
(74) *Attorney, Agent, or Firm* — Young & Thompson

(57) ABSTRACT

A method for communication between nodes in a wireless network, in particular in a wireless ad hoc or mesh network, wherein multiple wireless channels with different frequency bands are provided and wherein the nodes are enabled to operate on the different channels is characterized in that each the node has assigned a home channel where it usually resides, wherein a node that leaves its home channel and switches to another of the multiple channels—temporary operating channel—provides information about the temporary operating channel on the node's home channel.

13 Claims, 3 Drawing Sheets

METHOD FOR COMMUNICATION BETWEEN NODES IN A WIRELESS NETWORK

Figure 1:
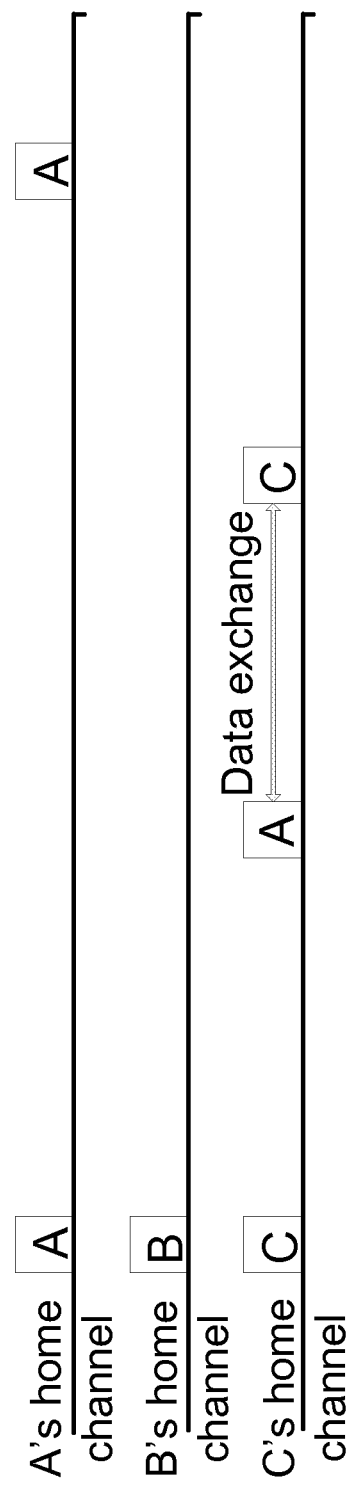

The present invention relates to a method for communication between nodes in a wireless network, in particular in a wireless ad hoc or mesh network, wherein multiple wireless channels with different frequency bands are provided and wherein said nodes are enabled to operate on said different channels.

In recent years, ad hoc networks and wireless mesh networks (WMNs) have emerged as a new technology that can be used to install wireless infrastructure in residential, campus, community, and even metropolitan areas. For ad hoc networks and WMNs, IEEE 802.11 is an interesting wireless technology because it is mature, inexpensive, and widely available. Many new applications are possible with IEEE 802.11 ad hoc mode, like for instance mesh networking, future home networking, car-to-car and car-to-infrastructure communication, etc. An important problem in IEEE 802.11-based ad hoc networks and WMNs is that their network capacity is rather limited because all nodes operate on a single channel. Consequently, the capacity of the ad hoc network is limited to channel capacity.

In general, there are two approaches for capacity improvement by exploiting multiple frequency bands in ad hoc networks and WMNs: MAC (Media Access Control) extension and routing extension. Routing extensions (as described for instance in R. Draves et al.: *Routing in Multi-Radio, Multi-Hop Wireless Mesh Networks*, in ACM MobiCom '04, September 2004, and in A. Raniwala et al.: *Architecture and Algorithms for an IEEE 802.11-Based Multi-Channel Wireless Mesh Network*, in IEEE Infocom 2005, March 2005) usually require nodes to have multiple wireless network interfaces with different NICs (Network Interface Cards) tuned to different channels.

On the other hand, MAC extension usually requires only one network interface and is thus more appealing. MAC extension, such as multi-channel MAC protocols, has attracted considerable attention recently since it enables nodes in a wireless ad hoc network to operate on multiple wireless channels. The main challenges of multi-channel MAC are the need to allow nodes to operate on different channels to avoid possible interference and to achieve coordination among nodes that possibly operate on different channels. A number of multi-channel MAC protocols have been recently proposed, which address the challenge of coordination among nodes in different ways:

1. The Dynamic Channel Assignment (DCA) protocol, for instance, uses two radio interfaces per node to operate on one control channel and multiple data channels (see Wu et al., *A new multi-channel MAC protocol with on-demand channel assignment for multi-hop mobile ad hoc networks*, ISPAN '00, December 2000). In DCA, one radio interface is tuned to the control channel and is called the control interface. The other radio interface is called the data interface and is dynamically switched to one of the data channels to transmit data packets and acknowledgments. Each node in DCA maintains a channel usage list CUL for all data channels. Nodes update their CUL based on the control frames that they overhear on the control channel. Further, each node also maintains a free channel list FCL that it dynamically computes from its CUL. DCA uses three types of control frames on the control channel for channel reservation: request-to-send (RTS), clear-to-send (CTS), and reservation (RES). When host A wants to send data to host B, host A inserts its FCL into a RTS frame and sends the frame to host B. Host B matches host A's FCL with its own FCL to select an available data channel (if any) and sends a CTS frame back to host A. Host A then sends a RES frame to prevent its neighbors from using the selected data channel for a specified interval. Neighbors of host A and host B can update their CUL based on the CTS and RES frame they overhear on the control channel.

2. The Multi-Channel MAC (MMAC) protocol uses only one radio interface to operate on multiple data channels (as described in J. So et al.: *Multi-channel MAC for ad hoc networks: Handling multi-channel hidden terminals using a single transceiver*, in ACM MobiHoc '04, May 2004). MMAC requires time synchronization among nodes and divides time into beacon intervals. Each beacon interval starts with a small window called ATIM window. MMAC borrows the term "ATIM" (Ad hoc Traffic Indication Message) from IEEE 802.11 Power Saving Mode but ATIM is used in MMAC for a different purpose. Each node in MMAC maintains a data structure called Preferable Channel List (PCL) that keeps track of channel usage within a node's neighborhood. In MMAC, a channel can have three states at a node: high, medium, and low preference. High preference indicates that the node has already selected this channel for the current beacon interval and must continue to choose this channel until the next beacon interval. Medium preference means that this channel has not been taken by any neighbors within the node's transmission range. Low preference indicates that this channel is already taken by at least one neighbor within the node's transmission range. Nodes also maintain per-channel counters to record the usage of each channel in a beacon interval. These counters allow nodes to balance channel load.

During an ATIM window, all nodes switch to a default channel to exchange beacons and ATIM frames (the default channel can also be used for data exchange outside of ATIM windows). When host A wants to send data to host B, host A inserts its PCL into an ATIM frame and sends it to host B. Host B compares host A's PCL with its own PCL to select a channel and transmits an ATIM-ACK frame back to host A. If host A cannot select the channel specified by host B because it has already chosen another channel, it must wait until the next beacon interval. Otherwise, host A sends an ATIM-RES frame with the selected channel so that neighbors within its transmission range can update their PCL. After the ATIM window, host A and host B switch to the selected channel to exchange data.

3. Slotted Seeded Channel Hopping (SSCH) uses only one radio interface to operate on multiple data channels (described in P. Bahl et al.: *SSCH: Slotted seeded channel hopping for capacity improvement in IEEE 802.11 ad-hoc wireless networks*, in ACM MobiCom '04, September 2004). SSCH requires time synchronization among nodes and divides time into slots. In SSCH, each node maintains a channel schedule containing a list of channels that the node plans to switch to in subsequent slots. A node's channel schedule is compactly represented as a current channel and a set of rules for updating channel. SSCH suggests that the set of rules is represented as a set of 4 (channel, seed) pairs. Each node iterates through its set of 4 (channel, seed) pairs in each slot and performs the following channel update:

$$channel_i \leftarrow (channel_i + seed_i) \bmod N$$

where i is between 0 and 3, and N is the number of available orthogonal channels, e.g., N is 3 for IEEE 802.11b and 13 for IEEE 802.11a. In SSCH, each node frequently broadcasts its channel schedule and keeps track of other nodes' channel schedules. When host A wants to send data to host B, host A can follow host B by adopting host B's channel schedule.

4. The Asynchronous Multi-channel Coordination Protocol (AMCP) requires only one radio interface per node and no time synchronization among nodes to operate on N data channels (see J. Shi et al.: *Starvation mitigation through multi-channel coordination in CSMA based wireless networks*, in ACM MobiHoc '06, May 2006). However, AMCP uses a dedicated control channel on which nodes exchange control frames to negotiate channel reservation. In AMCP, each node maintains a channel table with N entries corresponding N data channels. Each entry indicates whether a channel is available or for how long the channel is being used by other nodes within a transmission range. Further, each node maintains a variable prefer that can take values from 0 to N. If nonzero, prefer contains the index to a data channel that the node prefers. If zero, prefer indicates that the node has no preference.

When host A wants to send a data packet to host B, it first selects a data channel to compete for. If host A's variable prefer is nonzero and this channel is available, host A will select this channel. Otherwise, host A randomly selects one of its available data channels. Host A inserts the index to the selected data channel into a RTS frame and sends it to host B. When host B receives the RTS frame, host B can send a Confirming CTS with the index to the selected data channel if that channel is available for host B. Otherwise, host B sends a Rejecting CTS with a list of its available data channels. Upon receiving a Confirming CTS, host A switches to the selected channel and transmits a data packet to host B. Otherwise, host A selects a channel available for both host A and host B and sends a new RTS frame to host B. Other hosts within the transmission range of host A and host B can overhear the RTS and CTS frames and update their channel tables for channel availability accordingly.

Even though with multi-channel MAC nodes can exploit frequency diversity and the capacity of a wireless ad hoc network is no longer limited to that of a single channel, it is to be noted that the aforementioned protocols rely on two rather impractical assumptions: low channel switching latency and fine-grained clock synchronization among nodes. The problems with these assumptions are as follows. First, although possible, achieving fine-grained clock synchronization is rather difficult and requires considerable implementation overhead having an impact on the scalability of an ad hoc network. Second, synchronization using GPS devices increases production cost and implementation complexity, and cannot be used for indoor deployment. Third, as pointed out in measurements studies, channel switching latency on off-the-shelf IEEE 802.11 hardware is significantly higher than the assumptive values used in existing multi-channel MAC solutions. For example, the assumptive values are usually in the range of tens to hundreds of microseconds whereas measurements showed that the channel switching latency is several milliseconds in Linux and Windows (e.g. described in A. Raniwala et al., *Architecture and Algorithms for an IEEE 802.11-Based Multi-Channel Wireless Mesh Network*, IEEE Infocom 2005, March 2005, or in H. Wu et al., *Proactive Scan: Fast Handoff with Smart Triggers for 802.11 Wireless LAN*, IEEE Infocom 2007, May 2007). For these reasons, the proposed multi-channel MAC protocols do not work well under current practical limitations.

It is therefore an object of the present invention to improve and further develop a method for communication between nodes in a wireless network of the initially describe type in such a way that the aforementioned impractical assumptions are not required. Furthermore, the method shall be practical in the sense that an implementation on off-the shelf IEEE 802.11 hardware is possible.

In accordance with the invention, the aforementioned object is accomplished by a method comprising the features of claim 1. According to this claim such a method is characterized in that each said node has assigned a home channel where it usually resides, wherein a node that leaves its home channel and switches to another of said multiple channels—temporary operating channel—provides information about said temporary operating channel on said node's home channel.

According to the invention it has been recognized that a practical method for communication between (e.g. mobile) nodes in a wireless network can be achieved by means of asynchronous multiple channel hopping. Asynchronous means that the nodes operate asynchronously, i.e. that no time synchronization is required. The present invention proposes the assignment of a home channel for each node together with an information mechanism in case a node leaves its home channel. More specifically, a node that leaves its home channel and switches to another channel, referred to as temporary operating channel, provides information about the temporary operating channel on its home channel so that it can be found easily and efficiently by other nodes. As a consequence of the efficient provision of information concerning the nodes' temporary operating channels, multiple frequency bands can be exploited thereby significantly improving the capacity of an IEEE 802.11 based network. Furthermore, the method according to the invention requires only one network interface per network node, which enables network nodes to switch between different operating channels.

According to a preferred embodiment it may be provided that a node has an "idle or receiving" operational state and a "sending" operational state, wherein a node stays on its home channel when it is in the "idle or receiving" operational state. The "idle or receiving" operational state means that a node is in this state when it does not have any packets to send, i.e., the node is idle or is receiving packets. On the other hand, a node is in the "sending" state when it has pending packets for another node. Consequently, when a node has pending packets for another node, it makes a transition from the "idle or receiving" state to the "sending" state.

Advantageously, the coordination between a sending node and a receiving node is done once at the beginning of a connection. Such implementation of multi-channel MAC does not rely on clock synchronization and is thus attractive because it has lower implementation complexity, is more robust and cost-effective.

In case a node—sending node—has pending packets for another node—receiving node—that has the same home channel as the sending node, it may be provided that the sending node broadcasts a synchronization request on its home channel. When the receiving node receives the synchronization request, which is possible since it operates (i.e. sends and receives) on the same (home) channel, it can respond with a corresponding synchronization response. After this handshake, the two nodes can start exchanging data.

According to a particularly preferred embodiment selected channels are provided as rendezvous channels serving as contact points for nodes residing on different channels. The rendezvous channels are just regular IEEE 802.11 channels that can thus be conventionally used for data exchange. However, they also serve as initial contact points between two arbitrary nodes in case they do not find each other on their home channels. The list of rendezvous channels may be specified a priori by the network administrator or may simply be a subset of the available channels in a certain order.

In case a node—sending node—has pending packets for another node—receiving node—that has another home channel than the sending node, the sending node will have to leave its home channel temporarily and will have to attempt to find and reach the receiving node on another channel. In such case it may be provided that the sending node, before leaving its home channel, broadcasts a channel redirection message on its home channel. The channel redirection message may indicate the new channel the sending node switches to, so that other nodes residing on the sending node's home channel are informed of where to find the sending node. With respect to a more comprehensive information policy, it may be provided that the sending node successively broadcasts the channel redirection message on the rendezvous channels as well. To account for collisions and bit errors, the sending node may retransmit its channel redirection message a few times on each of the aforementioned channels.

With respect to the discovery process of a receiving node having another home channel than a sending node, two cases may be distinguished: In case the sending node knows the receiving node's home channel, it may just switch to that channel and attempt to contact the receiving node by broadcasting a synchronization request on that channel. The receiving node, in case it is on its home channel, may then respond to the synchronization request with a synchronization response. As already mentioned above, after such handshake data exchange may start. On the other hand, in case the receiving node is (temporarily) not on its home channel, other nodes on the receiving node's home channel that have knowledge about the receiving node's current channel may respond to the sending node with a "gratuitous" channel redirection message. The respect knowledge may result from the fact that the receiving node, before having left his home channel, has also broadcasted a channel redirection message on its home channel, indicating to other nodes on that channel the receiving node's new (temporary) operating channel.

In case of getting no response on the receiving node's home channel (neither by the receiving node itself, nor by any other node on that channel) and/or in case of not knowing said receiving node's home channel, it may be provided that the sending node searches for the receiving node successively through the list of rendezvous channels. The reason for this is that if the receiving node is absent on its home channel, the receiving node may have provided hints about its current channel on the rendezvous channels (as explained above). More specifically, it may be provided that the sending node attempts to search for the receiving node through the list of rendezvous channels, if it does not receive a synchronization response or a channel redirection message after a predefined number of transmitted synchronization requests.

In case the sender does not receive a synchronization response or a channel redirection message on any of the rendezvous channels, it may be further provided that the sending node proceeds to search for the receiving node on the remaining data channels. However, due to the provision of information by a node that leaves his home channel in accordance with the present invention this case should rarely happen and is only meant as a last resort to provide a failsafe solution.

With respect to a reliable home channel determination or assignment, it may be provided that each node initially chooses its home channel based on its node identifier, e.g., MAC address. However, when a node senses that its current home channel is congested, the node may randomly choose another home channel.

Also in this case it may be provided that the node broadcasts a respective channel redirection message on its old home channel, and, as the case may be, additionally on the rendezvous channels to announce its new home channel. To avoid instability, a node may use its new home channel for a minimum time interval before it chooses another new home channel if it senses that its new home channel is also congested.

According to a preferred embodiment the implementation of said multi-channel communication is based on hardware according to the IEEE 802.11 standard. The protocol for the proposed asynchronous multi-channel hopping can be implemented as an extension for the MAC protocol of IEEE 802.11. In this connection it is important to note that although three new control frames are introduced (synchronization request, synchronization response, and channel redirection message), it is possible to implement them within the framework of the standard IEEE 802.11. For example, these frames can be encoded as information elements embedded in the IEEE 802.11 action frames. This approach allows the proposed method to be compatible with legacy IEEE 802.11 nodes since they can ignore the information elements encoding control messages related to the present invention, but still operate with nodes that implement the present invention using the IEEE 802.11 MAC.

Figure 2:
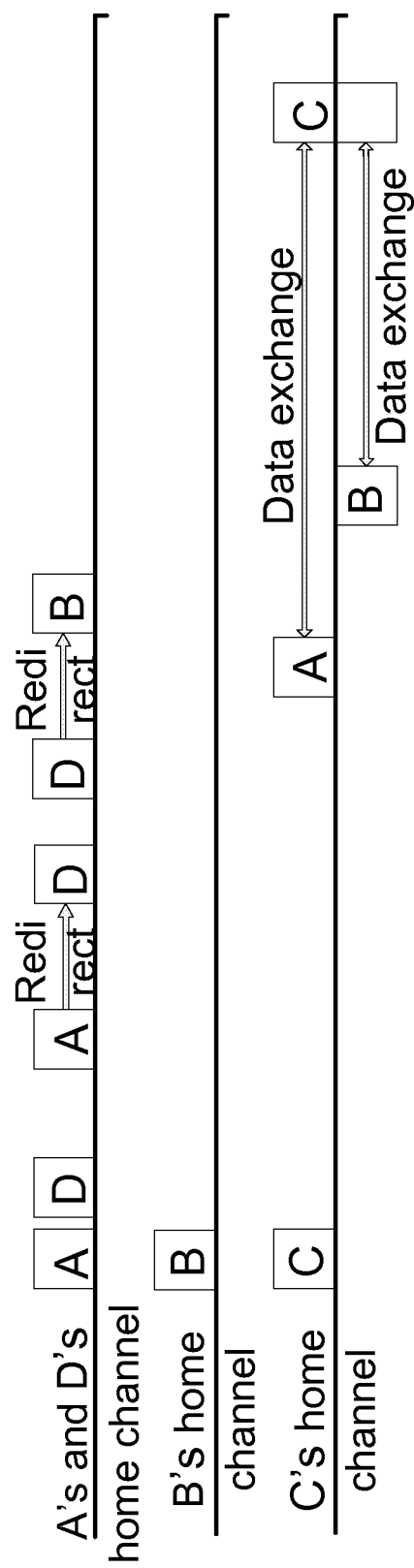
Figure 3:
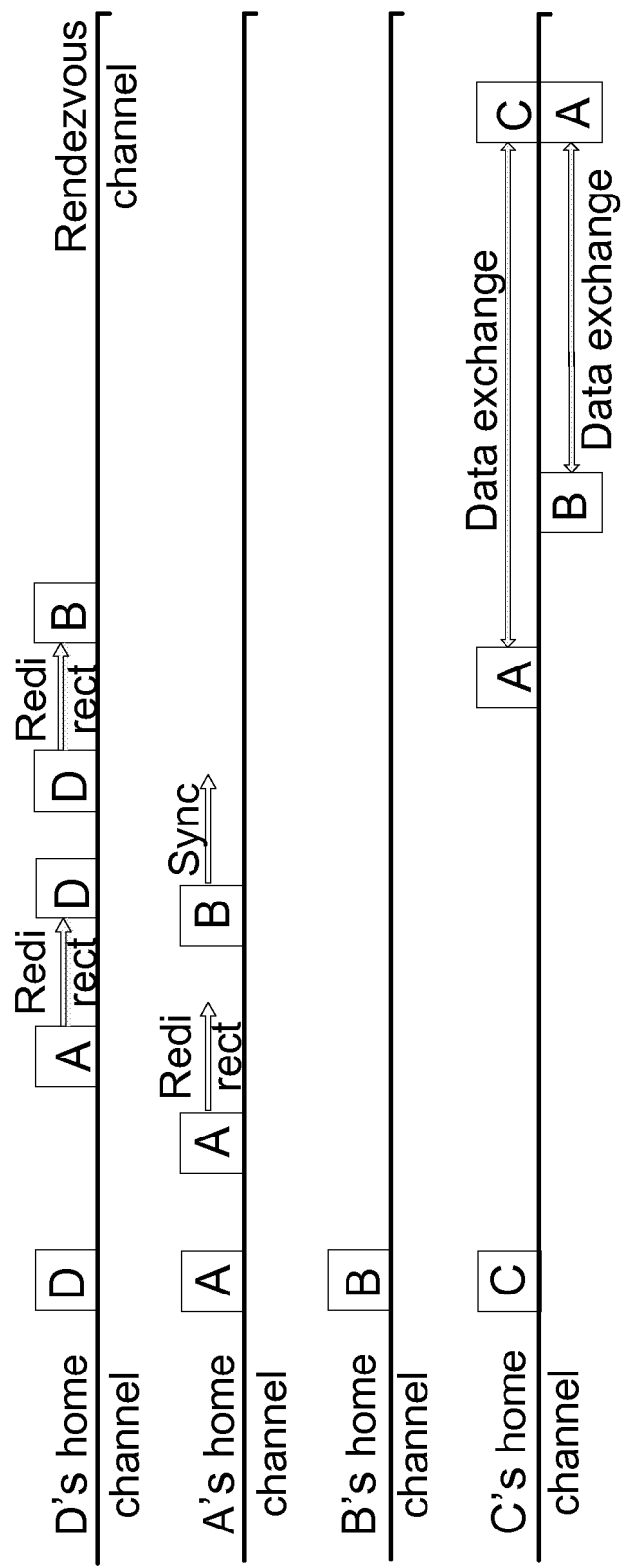

There are several ways how to design and further develop the teaching of the present invention in an advantageous way. To this end, it is to be referred to the patent claims subordinate to patent claim 1 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 schematically illustrates a first embodiment of a method according to the present invention in a basic application scenario, FIG. 2 schematically illustrates a second embodiment of a method according to the present invention with channel redirection via home channels, and FIG. 3 schematically illustrates a third embodiment of a method according to the present invention with channel redirection via rendezvous channels.

Basically, the method according to the present invention can be referred to as an asynchronous multi-channel hopping protocol (denoted AMHP in the following). An important aspect of the invention is that AMHP allows nodes belonging to the same wireless network to be located on different channels and provides a distributed mechanism for them to find each other. By this means significant capacity improvement of wireless networks can be obtained.

In the following first the requirements for a practical multi-channel MAC and motivation for these requirements are provided. The main motivations are:

1) Load Balancing Across Channels:

The main goal of multi-channel MAC is to improve the capacity of an ad hoc network by distributing flows that compete with each other on different orthogonal channels. Thus, it is important that multi-channel MAC achieves load balancing across all available channels and avoids bottleneck on any single channel.

2) Facilitating Coordination Among Nodes:

Another important goal of multi-channel MAC is to achieve coordination among nodes that possibly operate on different channels. For this reason, a multi-channel MAC has to provide efficient mechanisms for nodes to find each other fast and easily.

3) No Clock Synchronization:

A number of multi-channel MAC protocols require fine-grained clock synchronization to achieve coordination among nodes that possibly operate on different channels. As clock synchronization is rather complex to realize, a multi-channel MAC that does not rely on clock synchronization is more attractive because it has lower implementation complexity, is more robust and cost-effective.

4) Amortization of Channel Switching Overhead:

A number of existing multi-channel MAC protocols assume that the channel switching delay is rather small (tens or hundreds of microseconds). With this assumption, frequent channel switching incurs only a small performance overhead and can be used to achieve coordination among nodes. However, practical measurements showed that channel switching delay on off-the-shelf IEEE 802.11 hardware is rather large (several milliseconds). Given this practical limitation, it is important to design a multi-channel MAC protocol that avoids frequent channel switching.

AMHP fulfills requirement 1) by allowing nodes to operate on different wireless channels. Further, AMHP achieves load balancing by allowing a node to select a different operating channel when it senses that its current operating channel is overloaded.

To meet requirement 2), AMHP facilitates efficient coordination among nodes by employing two distributed mechanism for nodes to find each other. First, each node has a home channel where it usually resides so that other nodes can find it easily. Second, when a node leaves its home channel, it provides information about its temporary channel.

AMHP satisfies requirement 3) by allowing nodes to operate asynchronously.

To meet requirement 4), AMHP incurs an initial switching overhead only once at the beginning of a connection. This switching overhead is amortized over the connection's duration since no further switching is required afterwards. Instead of working on a per-packet basis or performing periodical channel switching, AMHP operates on a per-connection basis or in a relatively long time scale (hundreds of milliseconds). In this time scale, AMHP attempts to achieve load balancing by distributing nodes across different channels. If multiple nodes share a channel, AMHP relies on IEEE 802.11 MAC for media access control in short time scale (tens or hundreds of microseconds).

In AMHP, a node has two operational states: idle or receiving and sending. A node is in the idle or receiving state when it does not have any packets to send. A node is in the sending state when it has pending packets for another node.

1) Idle or Receiving State:

In AMHP, each node has a home channel. A node stays on its home channel when it is in the idle or receiving state. Each node initially chooses its home channel based on its MAC address. However, when a node senses that its current home channel is congested, it can randomly choose another home channel and broadcasts an AMHP channel redirection on rendezvous channels to announce its new home channel. To avoid instability, a node uses its new home channel for a minimum time interval before it chooses another new home channel.

2) Sending State:

When a node has pending packets for another node, it makes a transition from the idle or receiving state to the sending state. If the sender and the receiver have the same home channel, the sender can send an AMHP sync request (synchronization request) and the receiver can answer with an AMHP sync response (synchronization response). After this handshake, the two nodes can start exchanging data. If the sender does not know the receiver's home channel or the two node share different home channels, the sender will perform two steps: creating a channel redirection and finding the receiver.

Step 1: Creating a Channel Redirection:

Since the sender has to leave its home channel temporarily to reach the receiver on another channel, the sender informs other nodes about its temporary channel. To this end the sender first broadcasts an AMHP channel redirection on its home channel and then on a list of selected channels (rendezvous channels). The rendezvous channels are just regular IEEE 802.11 channels that can be used for data exchange. However, they also serve as initial contact points between two arbitrary nodes in case they do not find each other on their home channels. This list of rendezvous channels can be specified a priori by the network administrator or simply a subset of the available channels in a certain order.

Step 2: Finding the Receiving Node:

If the sender knows the receiver's home channel, the sender switches to that channel and attempts to contact the receiver by broadcasting an AMHP sync request. If the receiver is on its home channel, it replies with an AMHP sync response and the two nodes can start exchanging data. If the receiver is on another channel, other nodes on its home channel that have knowledge about the receiver's temporary channel can respond to the sender with a gratuitous AMHP channel redirection. If the sender does not receive an AMHP sync response or an AMHP channel redirection after a number of transmitted AHMP sync requests, it attempts to search for the receiver successively on the rendezvous channels.

Although step 1 and step 2 were described separately for the sake of clarity, it is possible to combine them. In this case, a node broadcasts AHMP sync request and AMHP channel redirection successively on the rendezvous channels to reduce the channel switching overhead.

When the sender does not know the receiver's current channel, it successively searches for the receiver on the rendezvous channels. The reason for this is that if the receiver is absent on its home channel, it also has provided hints about its current channel on the rendezvous channels (as explained above). In case the sender does not receive an AMHP sync response or an AMHP channel redirection on any of the rendezvous channels, it proceeds to search for the receiver on the remaining data channels. This case should rarely happen and is only meant as the last resort to provide a failsafe solution.

When the sender finds the receiver, the sender can start exchanging data with the receiver. After the data exchange, the sender successively switches to the rendezvous channels and broadcasts an AMHP channel redirection to inform other nodes that it now returns to its home channel.

Rather than extending IEEE 802.11 MAC and operating on a per-packet basis, AMHP can operate on a different time scale than IEEE 802.11 MAC. Thus, AMHP and the IEEE 802.11 MAC complement each other to achieve load balancing over multiple channels on two different timescales. With AMHP's design choice, a node is able to exchange data with multiple nodes in a time interval. In other multi-channel MAC protocols, a node can only exchange data with another node exclusively in a time interval.

An operational overview of AMHP is illustrated in the following three scenarios.

In the basic scenario depicted in FIG. 1, nodes A, B, and C stay on their respective home channel when they are in an "idle or receiving" operational state, i.e. in case they do not have any packets to send. If node A wants to exchange data with node C for instance, node A switches to C's home channel and starts exchanging data with C. However, before node A switches to node C, in accordance with the present invention node A leaves information about its temporary operating channel—node C's home channel—on its home channel. More specifically, node A broadcasts a respective channel redirection message on its home channel before switching to node C's home channel. Hence, other nodes residing on node A's home channel are informed of where node A is to be found.

After having made the transition from the "idle or receiving" state to the "sending" state and after having switched to node C's home channel, node A sends a synchronization request "AMHP sync request" (not shown) and the receiving node C responds with a synchronization response "AMHP sync response" (also not change). Upon this handshake the data exchange can be started. After the exchange of data is terminated, node A switches back to its home channel.

An example of channel redirection via home channel is illustrated in FIG. 2. In this scenario, nodes A, B, C, and D first stay on their respective home channels, wherein node A and node D share the same home channel. When node A wants to exchange data with node C for instance, again it first broadcasts a channel redirection message and then switches to C's home channel. After performing a handshake between nodes A and C on node C's home channel (e.g. by means of an "AMHP sync request" and an "AMHP sync response"), the two nodes can start exchanging data.

Further, according to the scenario illustrated in FIG. 2, node B wants to exchange data with node A and thus switches to node A's home channel. However, node A temporarily does not operate on its home channel, but on node C's home channel. Consequently, node B receives a channel redirection from node D, which had previously received the channel redirection message from node A and which is thus informed about node A's temporary operating channel. Based on this notification, node B can switch to node C's channel in order to communicate with node A. After performing handshake with node A on node C's home channel, node B and node A can start to exchange data. It is to be noted that nodes A, B, and C can share a common channel by using the original IEEE 802.11 MAC protocol.

An example of channel redirection via rendezvous channel is illustrated in FIG. 3. Although for the sake of clarity only one rendezvous channel is depicted in FIG. 3, it is to be understood that in real application scenarios several different rendezvous channels may be implemented. In the scenario of FIG. 3, nodes A, B, C and D first stay on their respective home channels. When node A wants to exchange data with node C, it broadcasts a channel redirection message on its home channel and on the rendezvous channel. (In case there are more than one rendezvous channel, the channel redirection message may be broadcasted on each of the different rendezvous channels). Subsequently, node A switches to node C's home channel and starts exchanging data with node C.

Node B wants to exchange data with node A and switches to node A's home channel. It broadcasts an "AMHP sync request" but does not receive any response since node A is temporarily operating on node C's home channel and can thus not receive the "AMHP sync request" of node B on its own home channel. Node B, as it does not receive any response to the "AMHP sync request", switches to the rendezvous channel (or successively to the different rendezvous channels in case there is more than one rendezvous channel) and receives a channel redirection from node D. Node D is informed about the current operating channel of node A due to the channel redirection message broadcasted by node A on the rendezvous channel. Upon reception of the channel redirection from node D, node B switches to node C's home channel and starts exchanging data with node A. In this connection it is to be noted that nodes A, B, C and D can share a common channel by using the original IEEE 802.11 MAC protocol.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for communication between nodes in a wireless network, comprising the steps of:
   providing multiple wireless channels with different frequency bands in a wireless ad hoc or mesh network; and
   operating said nodes in said wireless network to operate on said different ones of said multiple wireless channels,
   said operating step including
   i) assigning each said node a home channel where each said node usually resides, and
   ii) when a node that leaves said node's home channel and switches to another of said multiple channels as a temporary operating channel, providing information about said temporary operating channel on said node's home channel,
   wherein a sending node broadcasts a channel redirection message on said sending node's home channel in case said sending node has pending packets for a receiving node that has another home channel,
   wherein said node successively broadcasts said channel redirection message on rendezvous channels,
   wherein said sending node, in case said sending node knows said receiving node's home channel, switches to that channel and broadcasts a synchronization request on that channel,
   wherein said receiving node, in case said receiving node is on said receiving node's home channel, responds to said sending node with a synchronization response,
   wherein in case said receiving node is not on said receiving node's home channel, other nodes on said receiving node's home channel respond to said sending node with a channel redirection message,
   wherein said sending node, in case of receiving no response and/or in case of not knowing said receiving node's home channel, searches for said receiving node successively through the list of the rendezvous channels, and
   wherein said sending node, in case said sending node does not find said receiving node on any of said rendezvous channels, proceeds to search for the receiver on the remaining data channels.

2. The method according to claim 1,
   wherein a node has an "idle or receiving" operational state and a "sending" operational state, and
   wherein an individual node stays on said individual node's home channel when said individual node is in the "idle or receiving" operational state.

3. The method according to claim 2, wherein the coordination between a sending node and a receiving node is done once at the beginning of a connection.

4. The method according to claim 1, wherein the coordination between a sending node and a receiving node is done once at the beginning of a connection.

5. The method according to claim 1, wherein a sending node broadcasts the synchronization request on said sending node's home channel in case said sending node has pending packets for a receiving node that has the same home channel.

6. The method according to claim 5, wherein data exchange between said sending node and said receiving node is started upon said receiving node having broadcasted the synchronization response.

7. The method according to claim 1, wherein selected channels are provided as the rendezvous channels serving as initial contact points for said nodes residing on different channels.

8. The method according to claim 7, wherein said rendezvous channels are specified a priority by the network administrator.

9. The method according to claim 1, wherein a node's home channel is specified on the basis of said node's identifier.

10. The method according to claim 1, wherein an individual node, in case said individual node senses that said home channel—current home channel—is congested, chooses randomly another home channel—new home channel—.

11. The method according to claim 1, wherein an individual node, in case said individual node chooses a new home channel, announces said individual node's new home channel by means of broadcasting a channel redirection message.

12. The method according to claim 1, wherein the implementation of said multi-channel communication is based on hardware according to the IEEE 802.11 standard.

13. A method for communication between nodes in a wireless network, comprising the steps of:
providing multiple wireless channels with frequency bands in a same wireless network;
operating plural nodes asynchronously in said wireless network on different ones of said multiple wireless channels using an asynchronous multi-channel hopping protocol performing switching on a pre-connection basis, wherein said operating step includes i) assigning each said node a home channel where each said node usually resides, and
ii) when a node that leaves said node's home channel and switches to another of said multiple channels, as a temporary operating channel, providing information about said temporary operating channel on said node's home channel thereby allowing said plural nodes belonging to the same wireless network to be located on said different channels a mechanism to find said node operating on said temporary operating channel;
providing a load balancing by each node sensing whether a current operating channel is overloaded and, when the current operating channel is sensed to be overloaded, switching to a different operating channel as the temporary operating channel,
wherein each node operates has i) an idle or receiving operational state and ii) a sending operation state,
each said node is in the idle or receiving state when said node does not have any packets to send, and in the sending state when said node has pending packets for another node,
each node stays on said node's home channel when said node is in the idle or receiving state,
in the sending state when said node has pending packets for another node, the sending node switches to the temporary operating channel and creates i) a channel redirection on said node's home channel and ii) a list of rendezvous channels on said node's home channel, as the information about said temporary operating channel, and
in the sending state when said node has pending packets for another node and does not know the another node's current channel, the sending node finds the another node by searching for the another node on the rendezvous channels in order to establish a channel for sending the pending packets directly to said another node by switching to the another node's current channel and sending the pending packets directly to said another node on said another node's current channel.

* * * * *